May 28, 1935.  H. L. MORENCY  2,002,920
MILKING DEVICE
Filed July 26, 1933
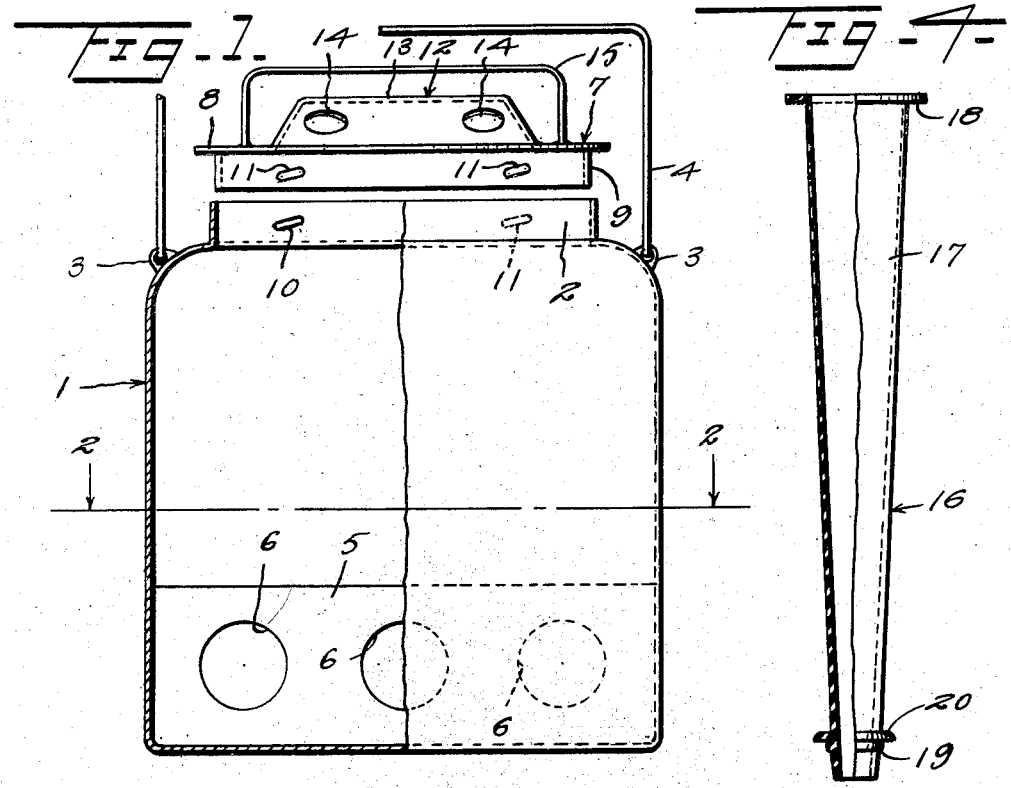
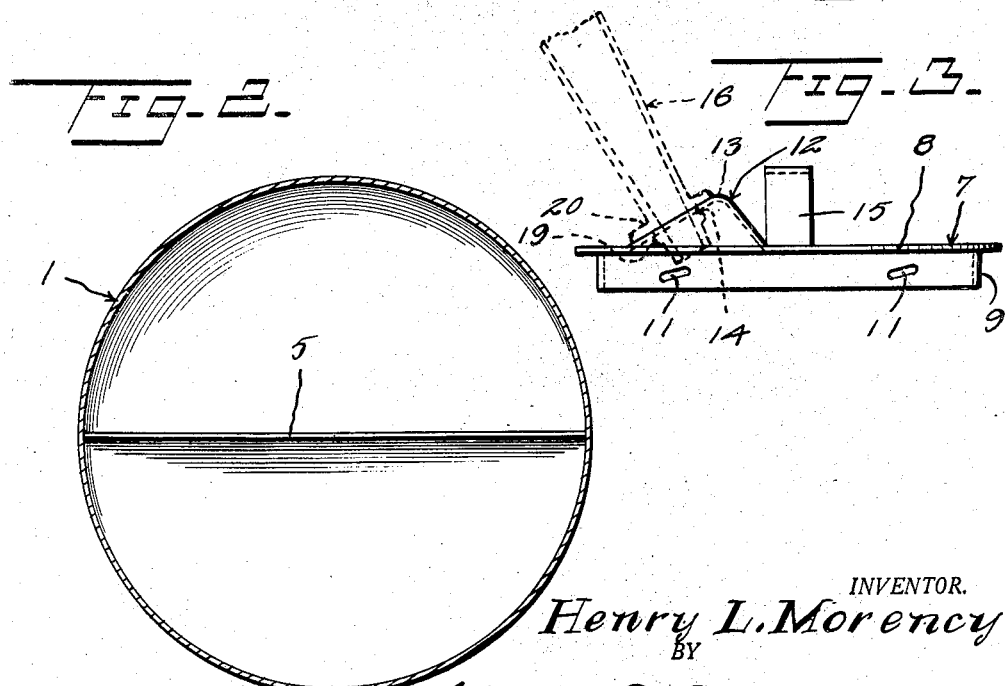
INVENTOR.
Henry L. Morency
BY
Watson E. Coleman
ATTORNEY Patented May 28, 1935

2,002,920

UNITED STATES PATENT OFFICE 2,002,920

MILKING DEVICE

Henry L. Morency, Boulder, Colo.

Application July 26, 1933, Serial No. 682,319

2 Claims. (Cl. 31—50)

This invention relates to improvements in milking devices and pertains particularly to an improved milking can and means for facilitating the conduction of milk directly from the teat of an animal thereinto.

The primary object of the present invention is to provide an improved milking device wherein the possibility of contaminating the milk as it is being withdrawn and discharged into the receptacle, is positively eliminated.

In the milking of a cow even under the most sanitary conditions the entrance of some foreign matter into the milking receptacle cannot be prevented and in cases where the milker is not particularly careful or the conditions under which the milking is conducted are insanitary, the milk receives a large amount of bacteria from various sources.

By the use of the device embodying the present invention the milk is not exposed at any time between its passage from the teat of the animal into the receiving receptacle and the entrance of bacteria into the milk from the hands of the milker or from other sources is positively prevented.

A further object of the invention is to provide a milking device consisting of a milk receiving receptacle and a flexible tube connected at one end with the receptacle and adapted to connect at its other end with the teat of the cow, in which a novel means is employed for coupling the tube with the receptacle whereby the coupling operation or the uncoupling of the tube from the receptacle, may be performed quickly and easily.

Another object of the invention is to provide a receptacle having a cover so designed that the milk conducting tube will connect therewith in such a manner that it will lead straight from the animal to the receptacle without being bent or otherwise deformed in any way which would interfere with the free flow of the milk therethrough.

A still further object of the invention is to provide, in a device of the character described, a receptacle having means therein whereby the milk may be easily agitated during the milking process so as to facilitate the rapid cooling thereof.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a view of the milk receptacle partly in side elevation and partly in vertical section showing in elevation a portion of the agitating means therein;

Figure 2 is a view in section of the receptacle taken on the line 2—2 of Figure 1;

Figure 3 is a view in side elevation of the receptacle lid viewing the same at right angles to the plane in which the same is shown in Figure 1;

Figure 4 is a view partly in side elevation and partly in longitudinal section of one of a pair of tubes which form a part of the device and which are coupled with the receptacle lid.

Referring now more particularly to the drawing wherein like numerals of reference indicate corresponding parts throughout the several views, the milk receptacle exclusive of the lid therefor, is indicated generally by the numeral 1. This receptacle has a reduced throat or neck portion which is in the form of a vertical flange 2. Suitable eyes 3 are formed upon the shoulders of the receptacle with which the ends of the handle bail 4 are oscillatably connected, the intermediate portion of the handle bail, in the illustration, being broken away.

Within the receptacle there is mounted in vertical position upon the bottom thereof the baffle wall 5 which extends through the radial center of the receptacle and is provided with a series of openings 6, preferably three.

The lid of the milk receptacle is indicated as a whole by the numeral 7, and as shown, comprises the top plate portion 8 which is in the form of a disk, from the under side of which depends the annular flange 9 which is inset with respect to the edge of the plate 8 and is of the proper diameter to snugly fit into the collar or throat portion 2 of the receptacle.

In order that the lid 7 may be retained firmly in place the collar portion 2 of the receptacle has pressed therein the inwardly projecting lugs 10 which coact with the recesses 11 pressed in the flange 9 of the lid, to lock the lid in place.

The portion 8 of the lid or cover has the upwardly pressed portion 12, one wall of which is disposed at a slight inclination with respect to the surface of the portion 8 of the lid, as indicated at 13. This inclined face 13 is directed toward the adjacent edge of the lid and is provided with a pair of openings each of which is indicated by the numeral 14. The lid is also provided with a handle 15 by which its application to and removal from the receptacle is facilitated. The numeral 16 indicates generally the tubes which are connected with the lid of the receptacle.

These tubes are formed throughout of rubber and as illustrated they are of gradually decreasing diameter from one end to the other. One of the tubes is of slightly greater length than the other to compensate for the differences in the distance between the receptacle and the two teats with which the tubes are connected.

The larger ends of the tubes, which are indicated by the numerals 17, are designed to be slipped over the animal's teat and these ends are provided with relatively heavy surrounding flanges 18 against which the thumb and fore finger of the operator's hand positions in the use of the device.

The larger ends 17 of the tubes are also formed relatively thin so that they can be readily adjusted as necessary to snugly receive the teat of the animal and at the same time the hand of the operator can work the teat in the required manner without interference from the tube which is interposed between his hand and the teat.

The rubber bodies of the tubes gradually increase in thickness from a point substantially midway of their ends to the smaller ends thereof and these thicker portions of the tubes are semi-rigid. At the smaller ends each of the tubes is designed to be slipped into an opening 14 in the receptacle cover and in addition to being tapered to facilitate this, is provided with a surrounding rib 19 and a relatively wide surrounding flange 20 which lies over and against the adjacent rib 19 in the manner illustrated. From this it will be readily apparent that when the tapered end of either tube is inserted into an opening 14 the rib portion 19 may be forced through the opening but the adjacent flange 20 will stop the further insertion of the tube so that the edge of the opening will locate between the rib and the flange and thus form a tight joint which will prevent the entrance of any foreign matter into the receptacle.

In addition to being made of good quality rubber the interior of the tubes are finished to form a smooth surface so that no places will be found in which bacteria may lodge. This also facilitates the ready sterilization and cleaning of the tube.

In the use of the device the tubes are connected with the lid of the receptacle in the manner described and the larger ends of the tubes are slipped over the teat of the animal so that the milk as it flows from the teat will pass through the tubes directly into the receptacle and will not be exposed to the surrounding outside atmosphere. During the milking operation the contents of the receptacle can be kept agitated so that the same will more rapidly cool off, by the operator occasionally partially rotating the receptacle back and forth upon its vertical or longitudinal axis so as to cause the milk in the can to be agitated, thus effecting the more rapid cooling by the action induced by the baffle wall.

Having thus described the invention, what is claimed is:—

1. In a milking receptacle, a receptacle body having an open top, a cover for said open top, said cover having a portion of its top pressed upwardly to form a flat inclined wall, said wall having an aperture therein, and an elongated milking tube of resilient material having one end of smaller diameter than the other, a broad flange surrounding said tube adjacent the smaller end, a rib surrounding the tube in close proximity to the flange and between the same and the adjacent end, and said tube being tapered from said rib to the adjacent end to facilitate its introduction into said inclined wall opening, said rib being yielding to pass through the opening whereby the edge of the opening will be held between the rib and said flange.

2. In a milking receptacle having a wall provided with an aperture, a tube of resilient material of constantly decreasing diameter from one end to the other, a relatively broad flange surrounding the tube adjacent the end of smallest diameter, a rib surrounding the tube in abutting relation with said flange and between the same and the adjacent end of the tube, the said tube having its outer face tapering from said rib to the adjacent end, the tube being of constantly decreasing wall thickness from said flange toward the end of greatest width, and a flange of relatively heavy material secured to and surrounding the tube at the end of greatest diameter, said tapered end of the tube being insertible in the receptacle wall opening and said rib being adapted to pass through the opening to engage the edge of the same between the rib and the first mentioned flange.

HENRY L. MORENCY.